(12) United States Patent
Chen et al.

(10) Patent No.: US 6,334,331 B1
(45) Date of Patent: Jan. 1, 2002

(54) UNINTERRUPTED SUB-LOOP WATER COOLING SYSTEM EQUIPPED WITH BUFFER TANK

(75) Inventors: Ming-Chung Chen; Min-Ter Lai, both of Hsin-chu (TW)

(73) Assignee: Taiwan Semiconductor Manufacturing Company, Ltd, Hsin Chu (TW)

(*) Notice: Subject to any disclaimer, the term of this patent is extended or adjusted under 35 U.S.C. 154(b) by 0 days.

(21) Appl. No.: 09/585,191

(22) Filed: Jun. 1, 2000

(51) Int. Cl.[7] .............................. F25D 17/02
(52) U.S. Cl. .......................... 62/434; 62/185
(58) Field of Search ................... 62/430, 434, 177, 62/185

(56) References Cited

U.S. PATENT DOCUMENTS

| | | | |
|---|---|---|---|
| 4,454,728 A | * | 6/1984 | Hanada et al. .............. 62/324.1 |
| 5,197,537 A | * | 3/1993 | Chigira et al. ................. 165/32 |
| 5,343,507 A | * | 8/1994 | Arnold et al. .............. 376/298 |
| 5,491,982 A | * | 2/1996 | Gowens ....................... 62/434 |

* cited by examiner

Primary Examiner—William Doerrler
(74) Attorney, Agent, or Firm—Tung & Associates

(57) ABSTRACT

An uninterrupted sub-loop water cooling system for supplying cooling water to a process machine during a short-term power interruption and a method for utilizing such system are disclosed. In the system, a buffer tank is provided for storing a quantity of cooling water maintained at a temperature of about 15° C. The buffer tank is provided with conduits for fluid communication with a process machine and at least one pump means operable by an uninterrupted power system such as a battery back-up system for pumping cooling water from the buffer tank to the process machine and then return to the buffer tank forming a sub-loop when a power shortage has occurred. The present invention system is effective in bridging a time gap between the occurrence of a power outage and the start of an emergency power generating system which amounts to between about 30 seconds and about 2 minutes such that cooling water supply to a process machine is not interrupted. By utilizing the present invention uninterrupted sub-loop water cooling system equipped with buffer tank, a loss in fabrication yield of the process machine can be substantially prevented.

20 Claims, 3 Drawing Sheets

UNINTERRUPTED SUB-LOOP WATER COOLING SYSTEM EQUIPPED WITH BUFFER TANK

FIELD OF THE INVENTION

The present invention generally relates to a cooling water supply system and more particularly, relates to an uninterrupted water cooling system capable of supplying cooling water to a process machine during a power interruption and a method for using the uninterrupted sub-loop water cooling system.

BACKGROUND OF THE INVENTION

In the fabrication of semiconductor devices, various fabrication processes must be conducted in various physical or chemical process machines. A great majority of semiconductor process machines requires a cooling capability such that the temperature of the process chamber can be suitably controlled. These fabrication machines include deposition chambers such as those used in chemical vapor deposition, physical vapor deposition and furnaces for growing silicon oxides.

In a semiconductor fabrication facility, the total cooling capacity of all make-up air units, recirculation air units, air coolers, ventilation units, and central and process utility systems is normally provided by a chilled water system. For instance, the dehumidification operation in a make-up air unit requires a 6° to 10° C. temperature change in order to remove the excess moisture from the air, while the temperature of a cooling coil employed in a recirculation air unit needs to be controlled above the dew point of 9° C. in order to prevent moisture from condensing such that the humidity inside a clean room can be maintained at a constant level. In a usual practice, the cooling water supply is returned or mixed in order to retain a temperature at between 14° and 18° C.

A water chiller can be constructed of a condenser and an evaporator. In most water chillers use in a semiconductor fabrication facility, the chiller is operated by a water-cooled principle supplied by a cooling tower. Inside the cooling tower, a cooling water is sprayed downwardly to meet the uprising outside air drawn in by a fan mounted on top of the cooling tower. A small amount of water evaporates as the water travels through the cooling tower such that, since evaporation of water demands heat, heat is removed from the cooling water to reach the desirable low temperature. In order to keep the system continuously running, the evaporated cooling water must be replaced.

Conventionally, cooling water required for semiconductor fabrication equipment is taken from a chilled water system using a heat exchanger. The primary side of the process cooling water system is connected to a chilled water supply system, while the secondary side is designed as an open system to keep the water pressure in the cooling water return lines as low as possible. For certain process tools such as physical vapor deposition chambers, the low return cooling water pressure is essential for preventing water from leaking into the process chamber. In the open process cooling water system, the recirculating cooling water is returned to a holding tank that is frequently opened to the atmosphere. Level sensors are used in the water holding tank to ensure a supply of deionized water to be added to the tank for compensating water loss due to evaporation.

A conventional cooling water supply system for semiconductor fabrication machines is shown in FIG. 3 and in systems A, B and C in FIG. 1. A typical cooling water system is shown as system A in FIG. 1 and in FIG. 3. A cooling water supply 10 at a temperature of about 13° C. is first fed into the process equipment 12 through a first conduit 14 and a first shut-off valve 16. The cooling water supply exits the process equipment 12 through conduit 18 and shut off valve 20 into a cooling water return line 22. FIG. 3 further shows that a plurality of shut-off valves 24 are further utilized with one installed to the cooling water inlet of each process machine 12. As shown in FIG. 3, a series of process machines 12 can be connected in series, or in parallel, for intaking cooling water from the same cooling water supply source, and furthermore, outputting cooling water to a factory cooling water return line 22.

Others have attempted to improve the basic cooling water system by adding either a heat exchanger, or a heat exchanger and a compressor to the cooling water system. This is shown in systems B and C in FIG. 1. In system B of FIG. 1, heat exchanger 26 is added to the cooling water system to further improve the temperature control of the cooling water. However, as shown in FIG. 2, System B suffers a significant loss in efficiency, i.e., the efficiency dropped to about 70%. In still another improvement to the basic cooling water system, as shown in System C of FIG. 1, both a heat exchanger 26 and a compressor 28 are utilized in a dual heat exchanger mode. In this variation, the temperature of the cooling water can be more accurately controlled, again at a significant loss in efficiency, i.e., only 60% as shown in FIG. 2.

None of the System A, System B or System C is capable of preventing the problem of cooling water lose during an electrical power interruption at a fabrication facility. When a power outage occurs, an emergency power generation system normally starts immediately to supply power. However, even when the emergency back-up power supply system is immediately put in operation, there is still a time delay of between 30 and 60 seconds in most fabrication facilities. During the short duration of time, the electrical motor that pumps cooling water to the process machines stops resulting in a temporary loss of temperature control in the process machine. The stopping of cooling water circulation to the process machine, and the resulting loss of temperature control can result in a serious loss in fabrication yield since most fabrication processes are sensitive to the process temperature.

It is therefore an object of the present invention to provide a water cooling system for semiconductor fabrication machines that does not have the drawbacks or shortcomings of the conventional water cooling systems.

It is another object of the present invention to provide an uninterrupted sub-loop water cooling system for supplying cooling water to a process machine during a temporary power interruption.

It is a further object of the present invention to provide an uninterrupted sub-loop water cooling system for supplying cooling water to a process machine by utilizing a buffer tank for cooling water storage and delivery during the power interruption.

It is another further object of the present invention to provide an uninterrupted sub-loop water cooling system for supplying cooling water to a process machine that can be operated at 95% efficiency while consuming low uninterrupted power.

It is still another object of the present invention to provide an uninterrupted sub-loop water cooling system for supplying cooling water to a process machine by utilizing a buffer tank, a pump means and a battery power back-up system for running the pump.

It is yet another object of the present invention to provide an uninterrupted sub-loop water cooling system for supplying cooling water to a process machine during a power interruption by utilizing a pump means for drawing cooling water from both a cooling water reservoir and a cooling water buffer tank during a power interruption.

It is still another further object of the present invention to provide a method for preventing an interruption of cooling water supply to a process machine that can be carried out by providing a buffer tank that stores a quantity of cooling water for feeding to a process machine during power interruption.

It is yet another further object of the present invention to provide a method for preventing an interruption of cooling water supply to a process machine by operating a pump powered by an uninterrupted battery power back-up system for circulating cooling water stored in a buffer tank.

SUMMARY OF THE INVENTION

In accordance with the present invention, an uninterrupted sub-loop water cooling system for supplying cooling water to a process machine during a power interruption and a method for utilizing the system are disclosed.

In a preferred embodiment, an uninterrupted sub-loop water cooling system for supplying cooling water to a process machine during a power interruption can be provided which includes a buffer tank for storing a quantity of cooling water equipped with an inlet and an outlet, the inlet is in fluid communication with a cooling water reservoir through a first conduit, the outlet is in fluid communication with a cooling water return through a second conduit, at least one pump means that has an inlet in fluid communication with the first conduit for drawing cooling water from both the cooling water reservoir and the buffer tank, and an outlet in fluid communication with a cooling water inlet on a process machine, a process machine that has a cooling water inlet and a cooling water outlet, the cooling water outlet is in fluid communication with a second conduit of the buffer tank, and an uninterrupted power supply for operating the at least one pump means to supply cooling water to the process machine during a power outage by forming a sub-loop water-cooling system wherein cooling water is drawn from the buffer tank through the first conduit to flow through the process machine and return to the buffer tank through the second conduit.

In the uninterrupted sub-loop water cooling system for supplying cooling water to a process machine during a power interruption, the first conduit and the second conduit each may include a shut-off valve. The buffer tank may have a capacity between about 40 liters and about 400 liters. The quantity of cooling water stored in the buffer tank may have a temperature of between about 12° C. and about 18° C. The at least one pump means may have a pumping capacity of not less than 300 liter per minute, or between about 100 liter per minute and about 1000 liter per minute. The at least one pump means may be a pump driven by a motor of at least 5 horsepower. The uninterrupted power supply may be a battery power system that is sufficient for operating the at least one pump means for at least 2 minutes. The inlet and the outlet of the at least one pump means each further includes a shut-off valve. The cooling water inlet and the cooling water outlet of the process machine each may further include a shut-off valve.

The present invention is further directed to a method for preventing an interruption of cooling water supply to a process machine which can be carried out by the operating steps of first providing a process machine that has a cooling water inlet and a cooling water outlet, providing a buffer tank storing a quantity of cooling water therein, the buffer tank is equipped with an inlet and an outlet, connecting the inlet of the buffer tank in fluid communication with a cooling water reservoir through a first conduit equipped with a first shut-off valve, connecting the outlet of the buffer tank in fluid communication with a cooling water return through a second conduit equipped with a second shut-off valve, and turning on a pump means connected in a passageway of the first conduit and drawing cooling water from the inlet of the buffer tank and delivering to the cooling water inlet of the process machine when a power outage is detected and when the first and second shut-off valves are closed, the cooling water flows through the process machine and exits through the cooling water outlet into the outlet of the buffer tank.

The method for preventing an interruption of cooling water supply to a process machine may further include the step of connecting an uninterrupted power supply to the pump means. The uninterrupted power supply may be a battery power system that is sufficient for operating the pump means for at least 2 minutes. The method may further include the step for filling the buffer tank with a quantity of cooling water between about 40 liters and about 400 liters. The method may further include the step of maintaining the quantity of cooling water in a buffer tank at a temperature of between about 12° C. and about 18° C., or the step of flowing the cooling water through the process machine at a flow rate between about 100 liter per minute and about 1000 liter per minute, or the step of driving the pump means by a motor of at least 5 horsepower. The method may further include the step of providing a shut-off valve to each of the cooling water inlet and the cooling water outlet on the process machine, or the step of controlling the operation of the pump means by a microprocessor, or the step of controlling the operation of the first and the second shut-off valves by a microprocessor.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figures 1, 2:
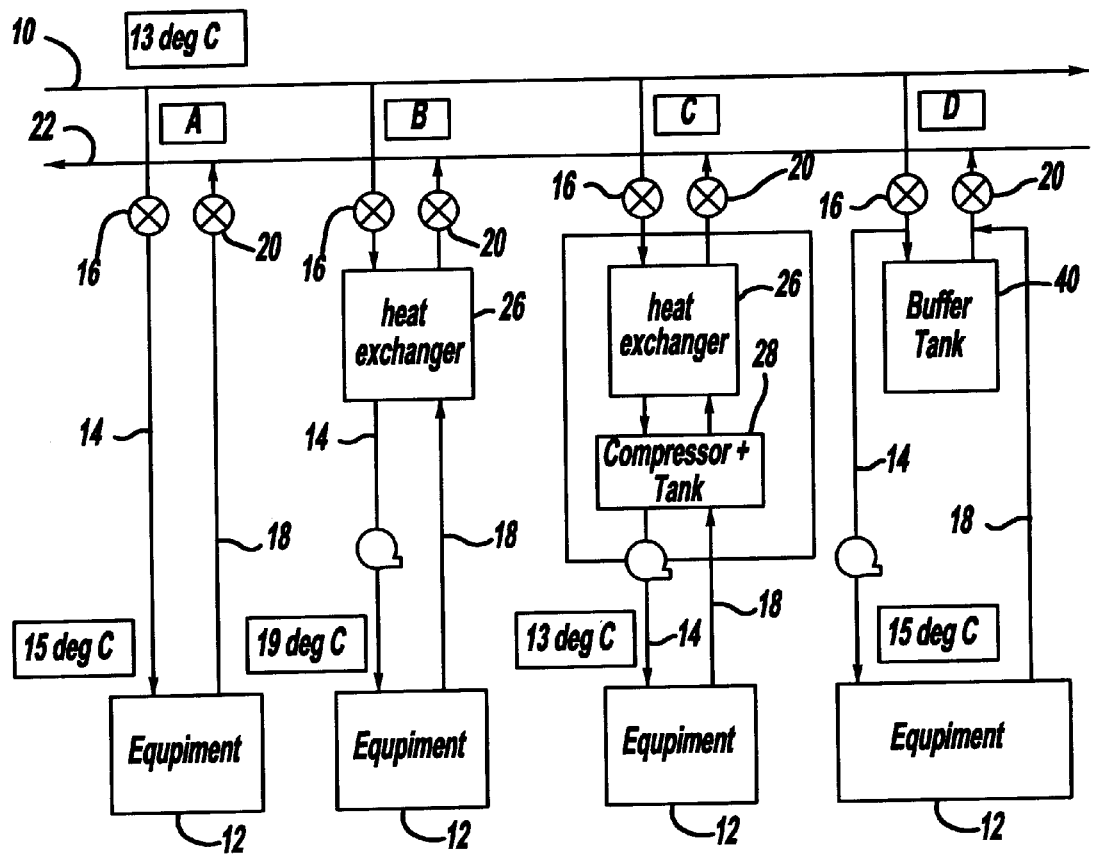
FIG. 1 is a block diagram of four different systems for cooling water supply including the present invention system.
FIG. 2 is a table illustrating the efficiencies, the uninterrupt capability and the uninterrupt power requirements for the various systems shown in FIG. 1.
Figure 3:
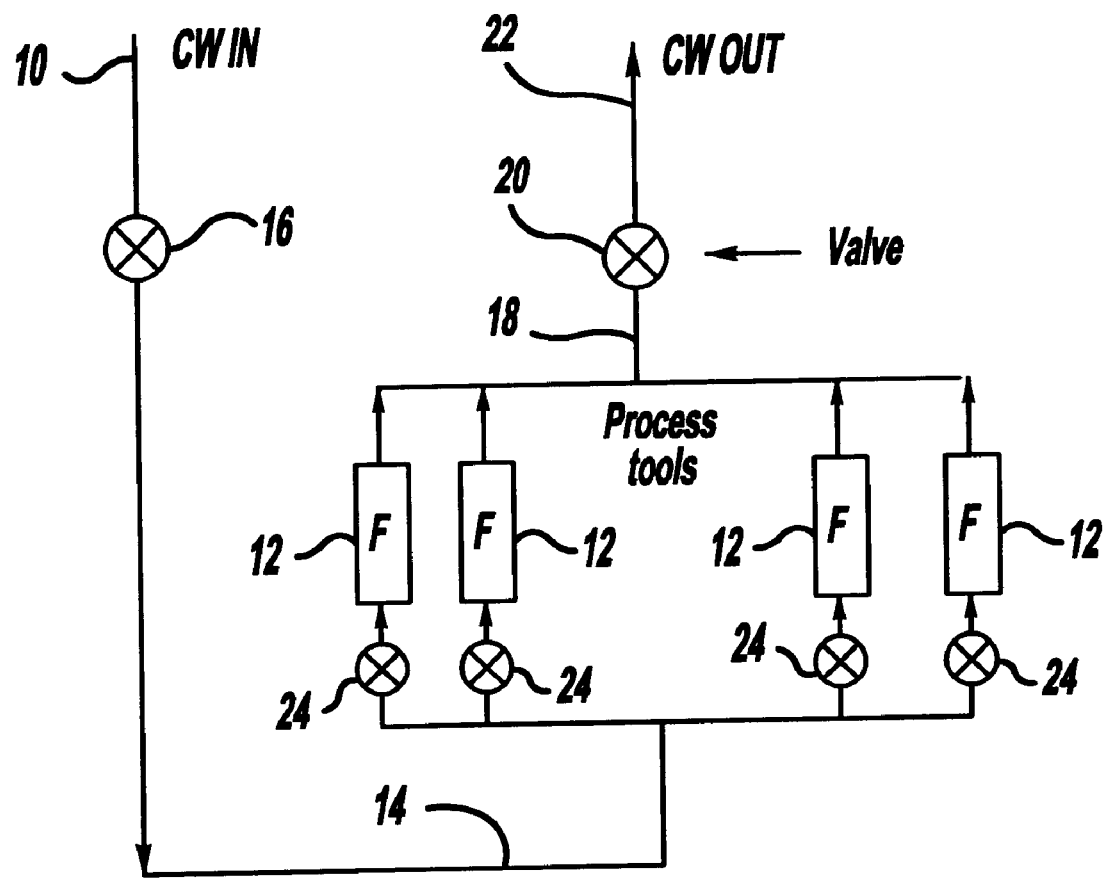
FIG. 3 is a diagram illustrating a conventional cooling water supply system.

The present invention discloses a cooling water supply system that is not affected by a short-term power interruption, i.e., effective for a time period of at least 2 minutes before the factory emergency power supply system kicks in. The invention further discloses a method for preventing an interruption of cooling water supply to a process machine by utilizing an uninterrupted sub-loop water supply system. The uninterrupted sub-loop water cooling system effective in supplying cooling water to a process machine during a power interruption is constructed by a buffer tank, at least one pump means, and an uninterrupted power supply for operating the at least one pump means. The buffer tank is used to store a quantity of cooling water and is equipped with an inlet and an outlet, the inlet is in fluid communication with a cooling water reservoir through a first conduit, while the outlet is in fluid communication with the cooling water return line through a second conduit. The at least one pump means has an inlet in fluid communication with the first conduit for drawing cooling water from both the cooling water reservoir and the buffer tank, and an outlet in fluid communication with the cooling water inlet on a process machine. The uninterrupted power supply, such as a battery back-up power supply system, is provided for operating the at least one pump means to supply cooling water to the process machine during a power outage by forming a sub-loop water cooling system wherein cooling water is drawn from the buffer tank through the first conduit to flow through the process machine and return to the buffer tank through the second conduit.

In the method for preventing the interruption of cooling water supply to a process machine, the steps include providing a process machine, providing a buffer tank, connecting a buffer tank to a cooling water supply and a cooling water return, and turning on a pump means powered by a battery power supply to pump cooling water from the buffer tank through the process machine, and return to the buffer tank forming a sub-loop water cooling system. The method is effective in supplying cooling water to a process machine immediately after a power outage, and before a factory emergency power generator kicks in, i.e., during a time period between 30 seconds and 2 minutes.

The buffer tank utilized in the present invention uninterrupted sub-loop water cooling system may have a capacity between about 40 liters and about 400 liters, while the quantity of cooling water stored in the buffer tank may have a temperature between about 12° C. and about 18° C. The pump means may have a pumping capacity of not less than 100 liters per minute or a pumping capacity between about 100 liters per minute and about 1000 liters per minute. The pump means may be a pump driven by a motor of at least 5 horsepower. The uninterrupted power supply may be advantageously a battery power back-up system of 10 kVA capacity. Various shut-off valves may be included in the conduit and in the cooling water inlet and outlet on the process machine.

Referring now to FIG. 1, wherein System D illustrates the present invention sub-loop water cooling system. The present invention System D is advantageously shown with the prior part water cooling systems A, B, and C to facilitate comparison. The efficiency of the present invention sub-loop water cooling system is shown in FIG. 2 at 95% which is significantly higher than that of Systems B and C.

As shown in FIG. 1, a buffer tank 40 is advantageously used in a present invention uninterrupted sub-loop water cooling system for supplying cooling water to process machine 12 during a short-term, or temporary power interruption. A more detailed diagram of the present invention sub-loop water cooling system 50 is shown in FIG. 4.

In the present invention uninterrupted sub-loop water cooling system 50, a buffer tank 40 is advantageously used and connected in fluid communication with cooling water reservoir 10 through a shut-off valve 16 and a first conduit 14. At least one liquid pump 42 is connected at an inlet 44 of the pump to the first conduit 14. The outlet 46 of the at least one liquid pump 42 is connected through conduit 14 to the cooling water inlet of the process machine 12. The at least one liquid pump 32 is powered by an uninterrupted power system (UPS) such as a battery back-up system that has a power capacity of 10 kVA. The battery back-up power system should be sufficient to operate the liquid pumps 42 for a time period of at least 2 minutes sufficient to allow the factory emergency power generators to kick in after a power outage.

Figure 4:
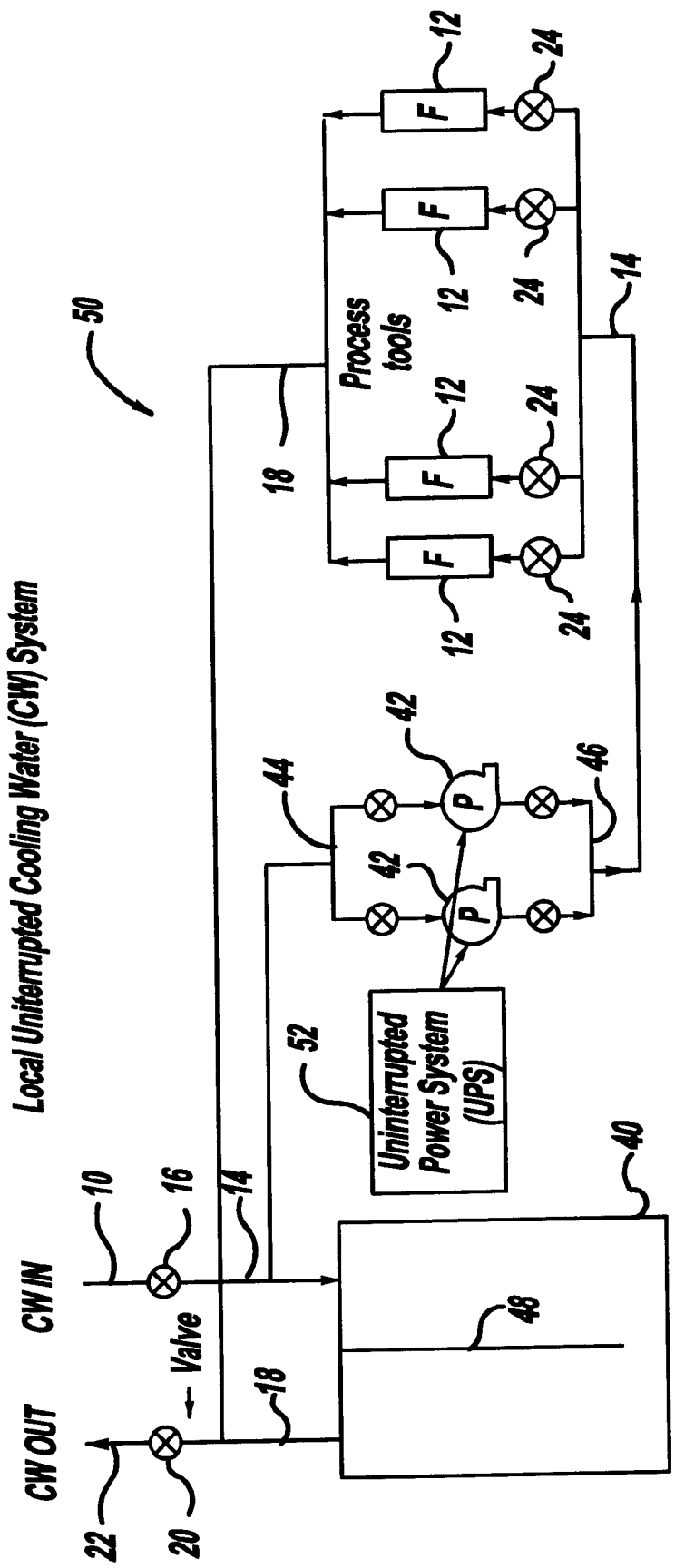
FIG. 4 is a diagram illustrating the present invention uninterrupted cooling water supply system.

As shown in FIG. 4, the buffer tank 40 should have a liquid capacity between about 40 liters and about 400 liters. In the context of this writing, the word "about" is to mean a value of ±10% of the average value given. The cooling water stored in the buffer tank has a temperature between about 12° C. and about 18° C., or an average temperature of about 15° C. The buffer tank 40 is further equipped with a buffer plate 48 installed as a center partition in the tank to minimize liquid flow in the tank.

During normal operation without a power outage, the at least one liquid pump 42 cycles the cooling water through the process machine 12, and then out of the conduit 18 into a cooling water return line 22. When the cooling water supply 10 is stopped due to a power outage, at such time the valves 16 and 20 are preferably closed, the at least one liquid pump 42 is operated by the battery back-up power 52 to induce a closed-loop, i.e., a sub-loop, cooling water flow through the buffer tank 40 and through conduits 14 and 18. The timing for the short-term cooling water supply can be calculated by the formula of:

$$(Q/t) \times T = (V_t + V_p) \times S \times \Delta T$$

Wherein Q is the water flow rate (liter per minute), T is the time to back-up (in minutes), Q/t is the heat exchange rate (In calories/min) $V_t$ is the volume of the buffer tank (in liter), $V_p$ is the volume of the conduit (in liter) and S is the specific heat of water, or 1, and $\Delta T$ is the temperature rise (in °C.).

The present invention uninterrupted sub-loop water cooling system equipped with a buffer tank for supplying cooling water to a process machine during a short-term power interruption and a method for utilizing such system have therefore been amply described in the above description and in the appended drawings of FIGS. 1~2 & 4.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

What is claimed is:

1. An uninterrupted sub-loop water cooling system for supplying cooling water to a process machine during a power interruption comprising:
   a buffer tank for storing a quantity of cooling water equipped with an inlet and an outlet, said inlet being in fluid communication with a cooling water reservoir through a first conduit, said outlet being in fluid communication with a cooling water return through a second conduit;
   at least one pump means having an inlet in fluid communication with said first conduit for drawing cooling water from both said cooling water reservoir and said buffer tank, and an outlet in fluid communication with a cooling water inlet on a process machine;
   a process machine having a cooling water inlet and a cooling water outlet, said cooling water outlet being in fluid communication with said second conduit on said buffer tank; and an uninterrupted power supply for operating said at least one pump means to supply cooling water to said process machine during a power outage by forming a sub-loop water cooling system wherein cooling water is drawn from said buffer tank through said first conduit to flow through said process machine and returned to said buffer tank through said second conduit.

2. An uninterrupted sub-loop water cooling system for supplying cooling water to a process machine during a power interruption according to claim 1, wherein said first conduit and said second conduit each further comprises a shut-off valve.

3. An uninterrupted sub-loop water cooling system for supplying cooling water to a process machine during a power interruption according to claim 1, wherein said buffer tank having a capacity between about 40 liters and about 400 liters.

4. An uninterrupted sub-loop water cooling system for supplying cooling water to a process machine during a power interruption according to claim 1, wherein said quantity of cooling water stored in said buffer tank has a temperature between about 12° C. and about 18° C.

5. An uninterrupted sub-loop water cooling system for supplying cooling water to a process machine during a power interruption according to claim 1, wherein said at least one pump means having a pumping capacity of not less than 100 liter per minute.

6. An uninterrupted sub-loop water cooling system for supplying cooling water to a process machine during a power interruption according to claim 1, wherein said at least one pump means having a pumping capacity of between about 100 liter per minute and about 1000 liter per minute.

7. An uninterrupted sub-loop water cooling system for supplying cooling water to a process machine during a power interruption according to claim 1, wherein said at least one pump means is a pump driven by a motor of at least 5 horsepower.

8. An uninterrupted sub-loop water cooling system for supplying cooling water to a process machine during a power interruption according to claim 1, wherein said uninterrupted power supply is a battery power system sufficient for operating said at least one pump means for at least 2 minutes.

9. An uninterrupted sub-loop water cooling system for supplying cooling water to a process machine during a power interruption according to claim 1, wherein said inlet and said outlet of said at least one pump means each further comprises a shut-off valve.

10. An uninterrupted sub-loop water cooling system for supplying cooling water to a process machine during a power interruption according to claim 1, wherein said cooling water inlet and said cooling water outlet of said process machine each further comprises a shut-off valve.

11. A method for preventing an interruption of cooling water supply to a process machine comprising the steps of:
providing a process machine having a cooling water inlet and a cooling water outlet;
providing a buffer tank storing a quantity of cooling water therein, said buffer tank equipped with an inlet and an outlet;
connecting said outlet of the buffer tank in fluid communication with a cooling water reservoir through a first conduit equipped with a first shut-off valve;
connecting said outlet of the buffer tank in fluid communication with a cooling water return through a second conduit equipped with a second shut-off valve; and
turning on a pump means connected in a passageway of said first conduit and drawing cooling water from said inlet of the buffer tank and delivering to said cooling water inlet of the process machine when a power outage is detected and when said first and second shut-off valves are closed, said cooling water flows through said process machine and exits through said cooling water outlet into said outlet of the buffer tank.

12. A method for preventing an interruption of cooling water supply to a process machine according to claim 11 further comprising the step of connecting an uninterrupted power supply to said pump means.

13. A method for preventing an interruption of cooling water supply to a process machine according to claim 12, wherein said uninterrupted power supply is a battery power system sufficient for operating said pump means for at least 2 minutes.

14. A method for preventing an interruption of cooling water supply to a process machine according to claim 11 further comprising the step of filling said buffer tank with a quantity of cooling water between about 40 liters and about 400 liters.

15. A method for preventing an interruption of cooling water supply to a process machine according to claim 11 further comprising the step of maintaining said quantity of cooling water in the buffer tank at a temperature between about 12° C. and about 18° C.

16. A method for preventing an interruption of cooling water supply to a process machine according to claim 11 further comprising the steps of flowing said cooling water through said process machine at a flow rate between about 100 liter per minute and about 1000 liter per minute.

17. A method for preventing an interruption of cooling water supply to a process machine according to claim 11 further comprising the steps of flowing said cooling water through said process machine at a flow rate between about 100 liter per minute and about 1000 liter per minute.

18. A method for preventing an interruption of cooling water supply to a process machine according to claim 11 further comprising the step of providing a shut-off valve to each of said cooling water inlet and said cooling water outlet on said process machine.

19. A method for preventing an interruption of cooling water supply to a process machine according to claim 11 further comprising the steps of controlling the operation of said pump means by a microprocessor.

20. A method for preventing an interruption of cooling water supply to a process machine according to claim 11 further comprising the step of controlling the operation of said first and second shut-off valves by a microprocessor.

* * * * *